(12) United States Patent
Shen et al.

(10) Patent No.: US 8,959,567 B1
(45) Date of Patent: Feb. 17, 2015

(54) IDENTIFICATION AND RECORDING OF PROGRAM SUB-SEGMENTS

(75) Inventors: Kevin Shen, Sunnyvale, CA (US); David Daney, San Jose, CA (US); Johannes Schmidt, Los Altos Hills, CA (US); Stephen S. Francis, Saratoga, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1874 days.

(21) Appl. No.: 10/919,803

(22) Filed: Aug. 16, 2004

Related U.S. Application Data

(60) Provisional application No. 60/495,495, filed on Aug. 15, 2003.

(51) Int. Cl.
*H04N 7/16* (2011.01)

(52) U.S. Cl.
USPC .......................................... 725/142

(58) Field of Classification Search
CPC . H04N 21/40; H04N 21/4147; H04N 21/442; H04N 21/4435; H04N 21/45; H04N 21/4586
USPC .................. 725/142; 386/46, 68–70, 83, 240; 358/908
See application file for complete search history.

(56) References Cited

U.S. PATENT DOCUMENTS

| | | | | |
|---|---|---|---|---|
| 4,750,052 A * | 6/1988 | Poppy et al. | ..................... | 386/63 |
| 5,818,510 A * | 10/1998 | Cobbley et al. | ............... | 725/139 |
| 6,061,056 A * | 5/2000 | Menard et al. | ................ | 715/704 |
| 6,208,799 B1 * | 3/2001 | Marsh et al. | .................... | 386/83 |
| 6,760,535 B1 * | 7/2004 | Orr | ................. | 386/241 |
| 6,782,186 B1 * | 8/2004 | Covell et al. | .................... | 386/46 |
| 6,792,617 B2 * | 9/2004 | Gorbatov et al. | ............. | 725/110 |
| 6,798,971 B2 * | 9/2004 | Potrebic | .......................... | 386/46 |
| 6,901,207 B1 * | 5/2005 | Watkins | ......................... | 386/83 |
| 6,973,256 B1 * | 12/2005 | Dagtas | .......................... | 386/241 |
| 6,985,669 B1 * | 1/2006 | Unger | ............................ | 386/46 |
| 7,159,232 B1 * | 1/2007 | Blackketter et al. | ............ | 725/38 |
| 7,369,750 B2 * | 5/2008 | Cheng et al. | .................... | 386/83 |
| 2002/0087979 A1 * | 7/2002 | Dudkiewicz et al. | ........... | 725/34 |
| 2002/0136538 A1 * | 9/2002 | Chen | .............................. | 386/111 |
| 2002/0174430 A1 * | 11/2002 | Ellis et al. | ....................... | 725/46 |
| 2003/0018980 A1 * | 1/2003 | Gorbatov et al. | ............. | 725/133 |
| 2003/0105794 A1 * | 6/2003 | Jasinschi et al. | .................. | 709/1 |
| 2003/0118326 A1 * | 6/2003 | Grooters et al. | ................ | 386/94 |
| 2004/0083484 A1 * | 4/2004 | Annon Ryal | ..................... | 725/1 |

* cited by examiner

*Primary Examiner* — Benjamin R Bruckart
*Assistant Examiner* — Anthony Bantamoi

(57) ABSTRACT

Techniques are provided for identifying and recording program segments and sub-segments for later playback and use. In general, in one aspect, the invention features a method of recording a sub-segment of a broadcast program. The method includes receiving a user input of one or more user specified parameters, identifying a program sub-segment starting point within a program using data in a broadcast stream, and identifying a program sub-segment ending point within a program. The method also includes storing a program sub-segment and presenting the program sub-segment to a user.

15 Claims, 6 Drawing Sheets

IDENTIFICATION AND RECORDING OF PROGRAM SUB-SEGMENTS

CROSS-REFERENCE TO RELATED APPLICATIONS

This application claims the benefit of U.S. Provisional Application Ser. No. 60/495,495, filed on Aug. 15, 2003.

BACKGROUND

The present invention relates to personal video recorders.

A personal video recorder ("PVR") also called a digital video recorder, has become a popular tool allowing a user to record television broadcasts. A user does not have to be present at the time of broadcast, but instead can view a desired program at a time of his or her choosing.

Conventional PVR's can specify the recording of a program whenever it is scheduled to be broadcast as well as specify how long, or how many, programs to retain in storage. For example, a user can specify that a particular news program be recorded, on a particular channel, at 6:00 p.m. nightly. The program can be retained for a specific period of time, for example, only until the next recording or otherwise retained for some other arbitrary period of time. The program can also be retained until deletion is necessary, for example, to recover storage space for recording other programming.

One type of PVR is TiVo, which allows users to record programming based on several criteria such as program title, type, actor/actress, director, or keyword. Typically, TiVo uses periodically downloaded program listing information to search for programming that matches the user's criteria. Program listing information typically includes the title, time, and a brief synopsis of the program. TiVo typically will record the program if a program listing matches the user's recording criteria.

SUMMARY

Techniques are provided for identifying and recording program segments and sub-segments for later playback and use.

In general, in one aspect, the invention features a method of recording a sub-segment of a broadcast program. The method includes receiving a user input of one or more user specified parameters, identifying a program sub-segment starting point within a program using data in a broadcast stream, and identifying a program sub-segment ending point within a program. The method also includes storing a program sub-segment and presenting the program sub-segment to a user.

Advantageous implementations of the invention include one or more of the following features. Identifying a program sub-segment starting point can further include searching for one or more keywords in a closed-caption stream, or audio stream of the program. Identifying a program sub-segment starting point can further include searching for a particular video frame in the program.

In general, in one aspect, the invention features a method of recording a most recent program segment or sub-segment. The method includes receiving a user input of one or more user specified parameters, identifying a program sub-segment starting point within a program, and identifying a program sub-segment ending point within a program. The method also includes storing a program sub-segment, storing one or more subsequent updated program sub-segments, and presenting a most recent program sub-segment to a user.

In general, in one aspect, the invention features a method of monitoring a broadcast stream. The method includes receiving a user input of one or more keywords, monitoring one or more broadcast channels for the one or more keywords within a broadcast stream, and identifying a program segment or sub-segment including the one or more keywords. The method also includes storing the program segment or sub-segment and presenting the stored program segment or sub-segment to the user.

Advantageous implementations of the invention include one or more of the following features. Monitoring can further include searching one or more broadcast closed-caption streams or audio streams for the one or more keywords. The monitoring can also further include providing an alert to a user when a program segment or sub-segment of interest is identified.

In general, in one aspect, the invention features a computer program product for recording a broadcast sub-segment. The product includes instructions to receive a user input of one or more user specified parameters, identify a program sub-segment starting point within a program segment using data in a broadcast stream, and identify a program sub-segment ending point within a program segment. The product also includes instructions to store a program sub-segment, and present the program sub-segment to a user.

In general, in one aspect, the invention features an apparatus. The apparatus includes an input operable to receive a user input and a memory operable to store one or more program segments or sub-segments. The apparatus also includes a controller including one or more engines operable to monitor one or more broadcasts and identify particular program segments or sub-segments. The apparatus also includes a user interface and an output operable to provide a program segment or sub-segment.

Advantageous implementations of the invention include one or more of the following features. The apparatus can include a preference engine operable to generate recording parameters. The apparatus can include a sub-segment identification engine operable to identify a beginning point and an ending point of a program sub-segment. The apparatus can include a search engine operable to search a program segment for one or more sub-segment identifiers. The apparatus can include a parse engine operable to separate a program sub-segment from a larger program segment. The apparatus can include a monitor engine operable to monitor a broadcast stream for one or more keywords identifying a program segment or sub-segment of interest. The apparatus can include a presentation engine operable to present a program segment or sub-segment to a user. The apparatus can include an update engine operable to monitor a broadcast stream and update a particular program segment or sub-segment with a more recent broadcast segment or sub-segment. The apparatus can include a monitor trigger engine operable to monitor a broadcast stream for triggers indicating a program segment or sub-segment of interest to record and an alert engine operable to notify a user when a program segment or sub-segment of interest has been detected.

The invention can be implemented to realize one or more of the following advantages. A PVR can be used to record a sub-segment of a program. The PVR can identify sub-segments using a closed-caption stream, audio stream, or video frames. The PVR can record subsequent modified programs or program sub-segments in order to provide the most recent version of the program to a user. The PVR can monitor broadcasts for items of interest. The PVR can monitor for specific keywords and store programs including the keyword or keywords for viewing by the user.

The details of one or more embodiments of the invention are set forth in the accompanying drawings and the descrip-

BRIEF DESCRIPTION OF THE DRAWINGS

Like reference numbers and designations in the various drawings indicate like elements.

DETAILED DESCRIPTION

Figure 1:
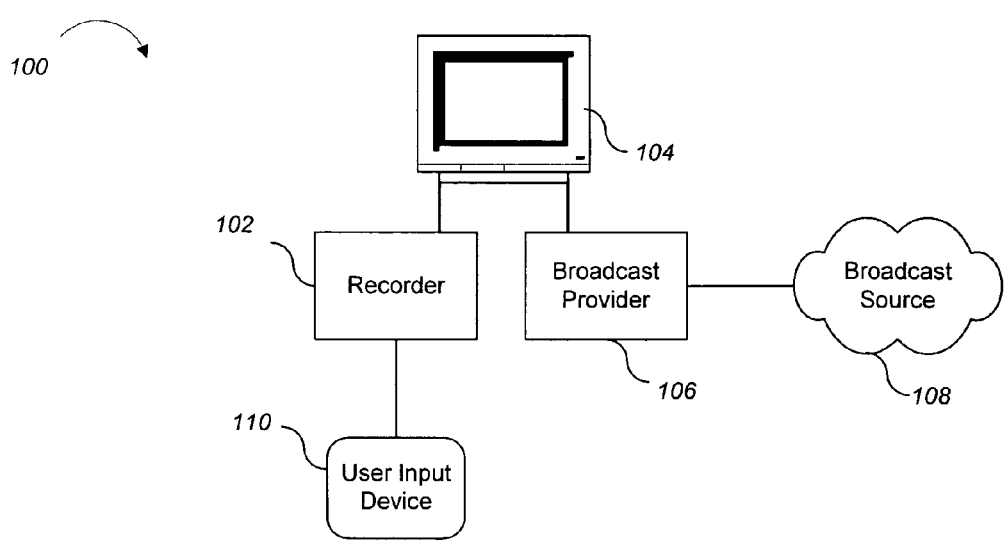
FIG. 1 shows a recording system.

FIG. 1 shows a recording system 100. The recording system includes a recorder 102 (e.g., a PVR), a display device 104, a broadcast provider 106, a broadcast source 108, and a user input device 110 for use by a user. The display device 104 can be, for example, a television or other display capable of displaying programming content. The broadcast provider 106 provides the programming content to the display device 104 from an outside broadcast source 108. The broadcast provider 106 can include, for example, a television tuner, a cable box, or a satellite receiver. The broadcast source 108 can include, for example, a cable network, satellite network, or a signal from a public television broadcast tower. The user input device 110 can provide a means of interaction between the user and the recorder 102. The user input device 110 can include, for example, a wireless remote control, a keyboard, a microphone, or any other device capable of receiving human input.

Figure 2A:
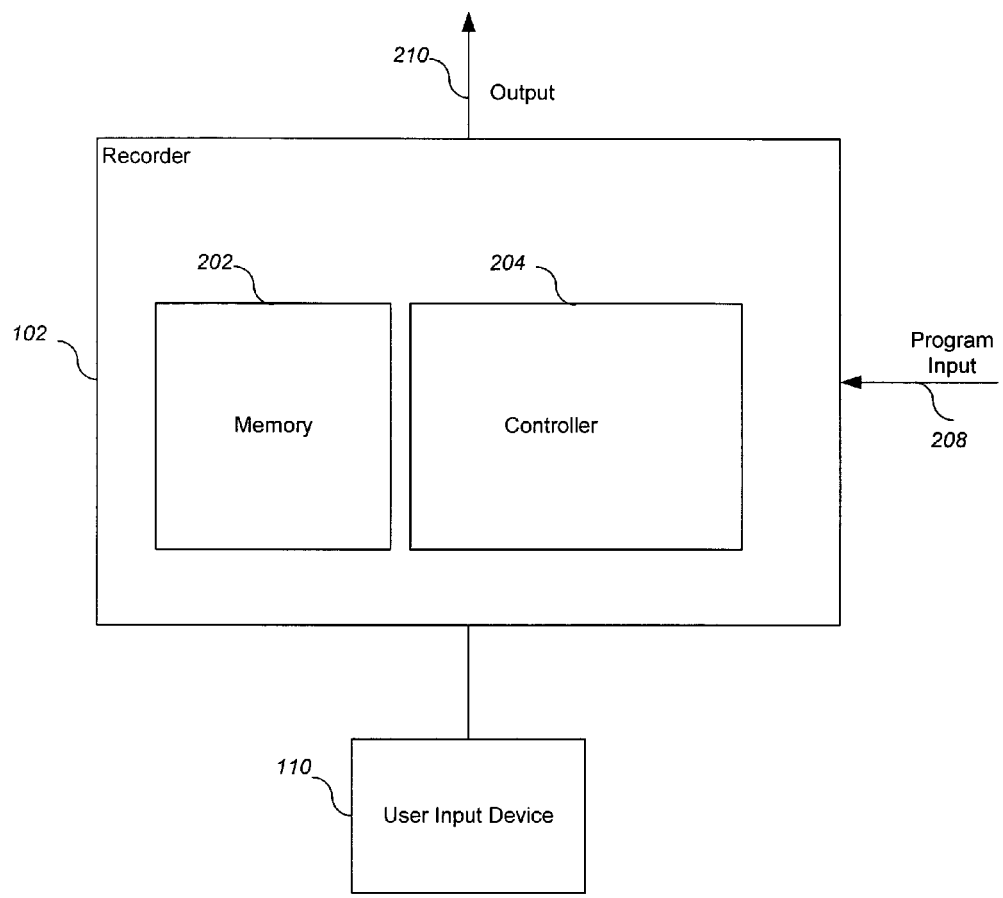
FIG. 2A shows a recorder.

FIG. 2A shows one implementation of the recorder 102. The recorder 102 includes memory 202 for storing recorded programming, for example, magnetic tape, a disk drive, an optical disk, or semiconductor memory. The recorder 102 also includes a controller 204 that includes an plurality of engines for controlling the recorder 102. The controller 204 can receive input that causes the controller 204 to record particular program sub-segments using the user input parameters. The recorder 102 includes inputs 208 for receiving a broadcast stream and for receiving data from a user though user input device 110. The recorder 102 also includes an output 210 for providing stored programming content to the user.

Figure 2B:
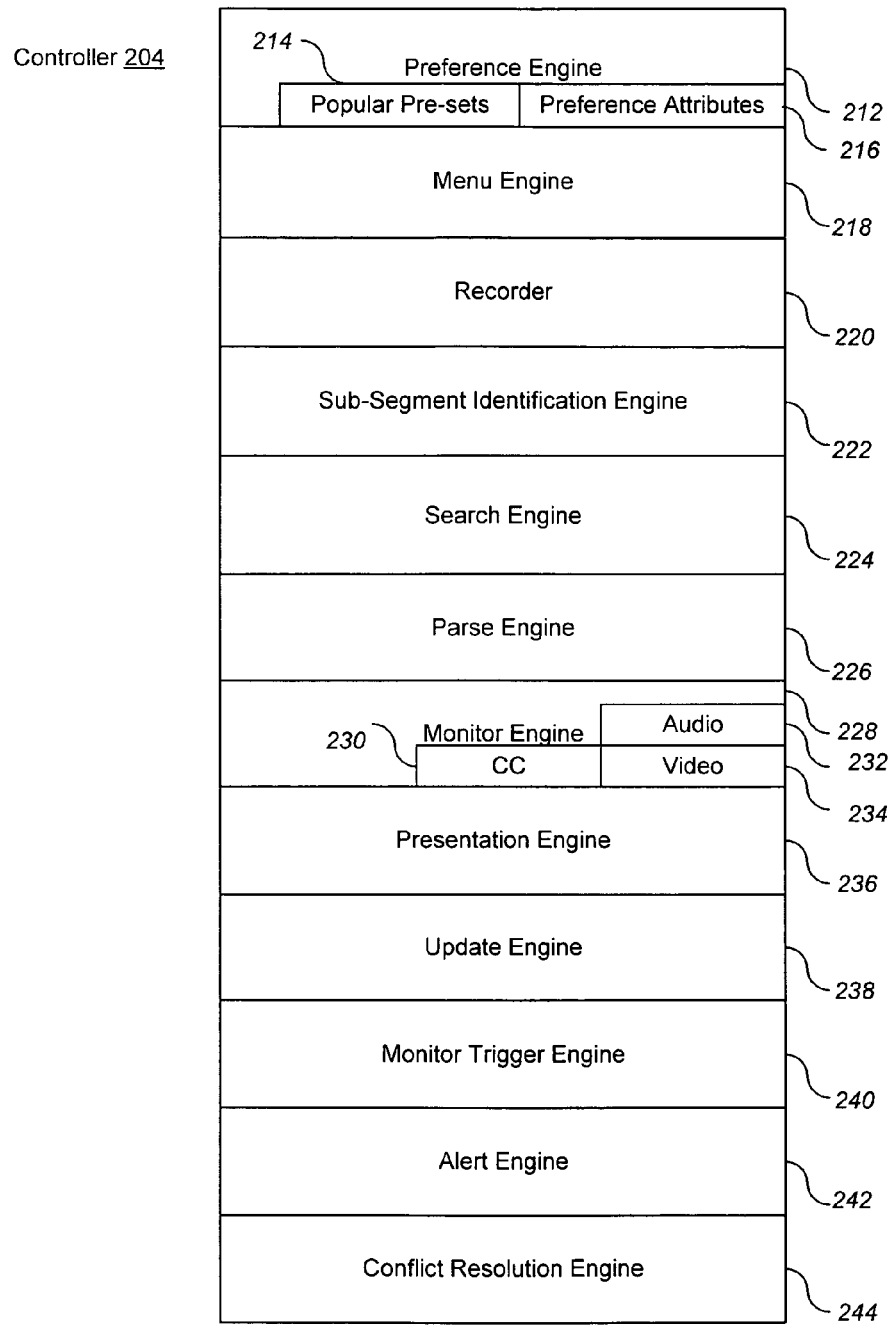
FIG. 2B shows a plurality of engines within the recorder of FIG. 2A.

FIG. 2B shows a plurality of engines comprising the controller 204 including a preference engine 212, a menu engine 218, a recorder 220, a sub-segment identification engine 222, a search engine 224, a parse engine 226, a monitor engine 228 a presentation engine 236, an update engine 238, a monitor trigger engine 240, an alert engine 242, and a conflict resolution engine 244.

Preference engine 212 generates recording parameters. The preference engine 212 can include popular pre-sets 214 that provide a set of recording parameters for popular sub-segments as well as preference attributes 216 derived from user input. Menu engine 218 provides menu driven interaction with a user, for example, to select recording or preference attributes. Recorder 220 records program segments and sub-segments using recording parameters generated by the preference engine 212.

Sub-segment identification engine 222 identifies the beginning and ending points of a particular sub-segment to store for later viewing by a user. Search engine 224 searches a program segment for sub-segment identifiers such as keywords in a closed-caption stream. Parse engine 226 is used to separate a program sub-segment, identified by the sub-segment identification engine 224, from a larger program segment. Monitor engine 228 monitors a broadcast stream for keywords or other identifiers of a segment or sub-segment of interest. The monitor engine can monitor data as part of a closed-caption engine 230, audio engine 232, or video engine 234.

Presentation engine 236 presents the program segment or sub-segment recorded by recorder 220 to a user. Update engine 238 monitors programming and updates a particular segment or sub-segment with a more recent broadcast. Monitor trigger engine 240 monitors a broadcast stream for triggers indicating a segment or sub-segment of interest to record. Alert engine 242 notifies a user when a segment or sub-segment of interest to the user has been detected in the broadcast stream. Conflict resolution engine 242 reconciles conflicts between recording parameters, for example when more program recordings are triggered to occur simultaneously than the recording engine 220 can record.

In operation, the recorder 102 can allow a user to store sub-segments of a broadcast program segment. A program segment is a complete program, for example, a television program. A program sub-segment is a distinct portion of a program segment. For example, a program segment such as an episode of 60 Minutes typically includes several smaller segments on individual stories. The individual stories are an example of a sub-segment. A sub-segment can also be a arbitrary division of a program segment based on a length of time or some other criteria.

Figure 3:
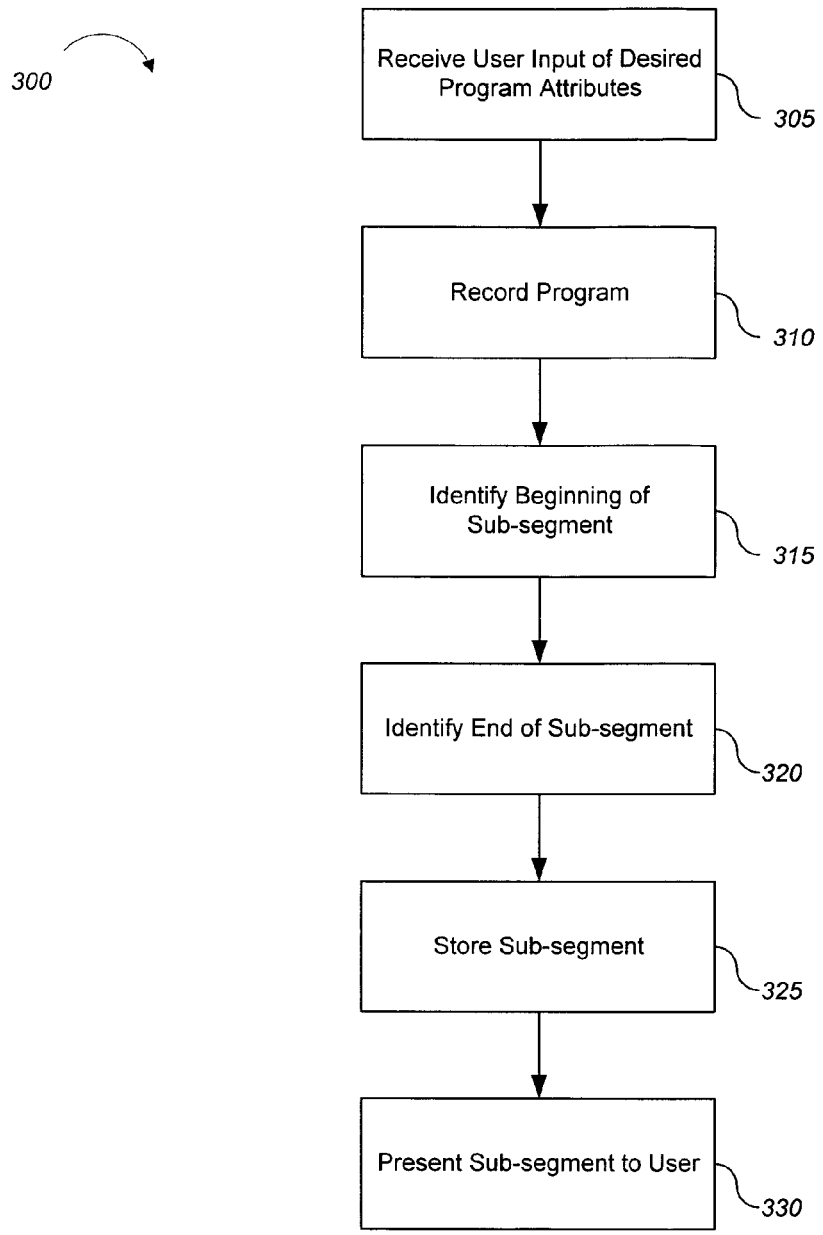
FIG. 3 shows a method for recording a program sub-segment.

FIG. 3 illustrates a method 300 for recording a program sub-segment. A system (e.g., recorder 102) receives a user input of program attributes for recording (step 305) (e.g., input into preference engine 212). The user input can include basic parameters such as a name of a program, a time of the program, and a channel on which the program will be broadcast (e.g., stored as preference attributes 214). If a user inputs a name of a program, the system can search an available program schedule to determine one or more times and channels in which the desired program is scheduled to be broadcast. The basic parameters can be very broad, for example, to record "CNN" all day, every day. In one implementation, a user selects a desired parameter, such as a start time, from a pull down menu (e.g., generated using menu engine 218). In another implementation, the user inputs a record command at the time the program begins and the system determines a desired start time for a sub-segment according to features of the system as described in detail below. In one implementation, popular sets of parameters can be pre-programmed into the system allowing a user to select pre-set parameters (e.g., stored as popular pre-sets 214).

The system can record the program as specified by the basic parameters (step 310) (e.g., using recorder 220). The system can then identify a specific program sub-segment to store from the recorded program during or after the recording of the program (e.g., using sub-section identification engine 222). The system identifies the beginning of the program sub-segment to record using other input parameters previously provided by the user (step 315).

In one implementation, the user can provide one or more time offsets from the beginning of the program indicating a beginning of a sub-segment. For example, CNN Headline News is typically scheduled in program guides as a single program having a length of eight hours. However, a typical Headline News program can be divided into half-hour sub-segments, each of which provides an overview of the current top news stories. A user can provide, as an input parameter, instructions to record only a particular half-hour program sub-segment and specify, for example, the sub-segment time offset from the beginning of the program segment by 30 minutes, 60 minutes, or some other amount.

In one implementation, a user can record a sports sub-segment of a local news program. For example, the local news program can include sub-segments on news, sports and weather, with the sports section always occurring 20 minutes into the one-half hour local news program. The time offset can be set for 20 minutes after the beginning of the local news program in order to record only the sports sub-segment of the broadcast.

In another implementation, a user may specify one or more keywords to search for in a closed-caption stream indicating the beginning of a sub-segment of interest (e.g., using search engine 224). When the keyword is encountered in the closed-caption stream (e.g., using closed-caption engine 228 of monitor engine 226), the system can specify the beginning point of the sub-segment to store by the occurrence of the keyword or by a time offset before or after the occurrence in the closed-caption stream of the keyword occurs. For example, the system can set the beginning of the sub-segment to store as one minute prior to the occurrence of the keyword. Thus, once the keyword is identified in the closed-caption stream, the system stores the sub-segment beginning at a point one minute prior to the keyword. Storing prior to the keyword is possible in implementations in which the system records, at least temporarily, the entire program and then parses out the sub-segment of interest. The remaining portions of the program can be discarded after the sub-segment is stored.

In another example, the Weather Channel typically provides a local weather forecast at some point during a large program block of three to nine hours in length. While the local forecasts are generally provided at regular intervals each hour (e.g., 8, 18, 28, 38, 48, and 58 minutes past the hour), a signal other than the time offset can be used to identify the beginning of one of the local forecast sub-segments. For example, the beginning of each local forecast can begin with the words "now for your local forecast" that appear in the closed-caption stream. The actual local forecast sub-segment can begin immediately with the words, or before or after the words. The time offset feature can be used to calibrate the correct sub-segment beginning time. For example, the local forecast sub-segment can actually begin one minute after the words "now for your local forecast" so the system can begin storing the sub-segment one minute after identifying the words in the closed-caption stream.

A closed-caption stream may not be available for all programs. In one implementation, the system can monitor the audio signal of a broadcast (e.g., using audio engine 232 of monitor engine 228) and use speech recognition techniques to identify one or more keywords indicating the beginning of the desired sub-segment. Again, the time offset feature can be used to calibrate the recording such that the stored sub-segment begins at the appropriate time.

In another implementation, the system can identify one or more video frames in a broadcast that identify a particular sub-segment (e.g., using video engine 234 of monitor engine 228). The occurrence of the video frame can be used to set the beginning point of the sub-segment. Alternatively, a time offset can be used to calibrate the beginning time from the video frame. The video fame can be a frame that occurs each time a particular sub-segment is broadcast. For example, when the Weather Channel begins broadcasting a local forecast, a particular video frame can be displayed indicating that the local forecast sub-segment is about to begin.

After the beginning of a sub-segment is identified, the ending of the sub-segment can also be identified (step 320) (e.g., using sub-segment identification engine 222). In one implementation, the system identifies an ending point of a particular sub-segment by a time duration. For example, the ending point can be ten minutes after the beginning of the sub-segment. For some sub-segments, the duration can be known, for example, the typical length of a sports segment in a news program can be six minutes. Thus, once the beginning of the sports sub-segment has been identified, the ending point is set for six minutes after the beginning point. The lengths of standard sub-segments can be stored in a memory (e.g., memory 202) and used to determine sub-segment ending points. For example, Headline News typically occurs in one-half hour sub-segments. Therefore, the system can end a recording of a particular sub-segment after one-half hour of recording. Alternatively, the duration can be specified by the user or the duration can be an arbitrary time determined by the system. For example, the system can store a sub-segment for 10 minutes after the occurrence of a keyword indicating the beginning of a sub-segment.

In another implementation, the ending point is determined using the closed-caption stream. Specific words indicating the end of a segment can be identified and used with or without a time offset to establish an ending point of a program sub-segment. For example, the closed-caption stream of news broadcast can include specific words such as "and now back to the studio" in order to indicate the end of a sub-segment that does not necessarily have a predetermined length.

In one implementation, one or more keywords are searched for in the audio stream using speech recognition programs. Certain keywords indicate the end of a program sub-segment. In another implementation, the system identifies one or more particular video frames (e.g., using video engine 234) that can be used to identify the ending point of a program sub-segment. Both speech recognition and video frame identification can be performed as described above with respect to identifying the beginning of a program sub-segment.

After both the beginning and end of a program sub-segment has been identified, the program sub-segment can be parsed from the larger recorded program segment (e.g., using parse engine 226) and stored (e.g., in memory 202) (step 325) while the rest of the program is discarded. The stored sub-segment can then be presented to the user for viewing (e.g., using presentation engine 236), for example, on display 104 (step 330).

Figure 4:
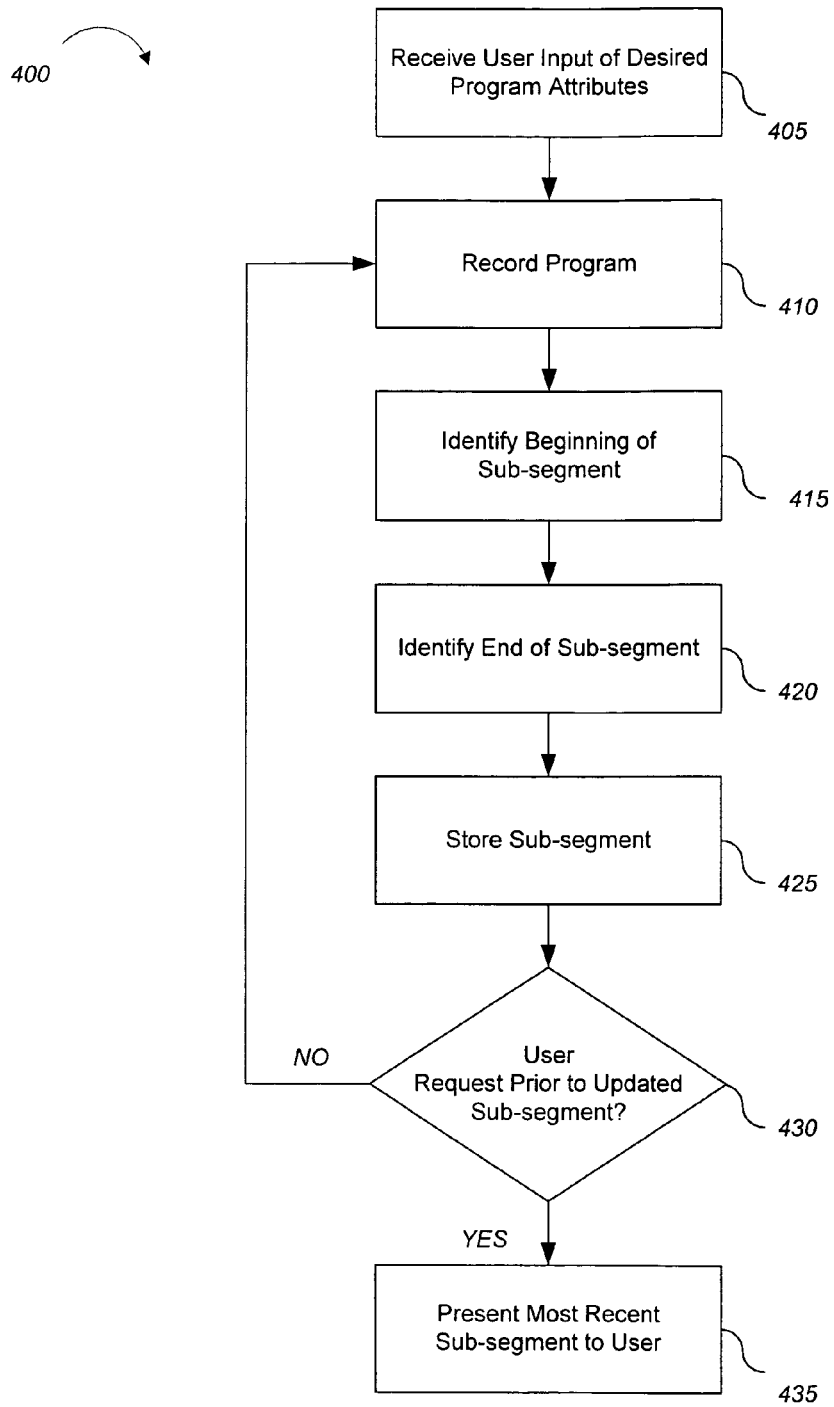
FIG. 4 shows a method for recording a most recent program sub-segment.

As shown in FIG. 4, a method 400 is provided for recording a most recent program sub-segment and presenting the sub-segment to a user. Some program segments or sub-segments are updated or otherwise modified and then re-broadcast at a later time. For example, the program sub-segments on CNN Headline News are typically updated throughout the program such that each subsequent iteration of the sub-segment provides the most up to date news information. The recording method is similar to the method 300 described above with respect to FIG. 3. The system receives user input of program attributes (step 405). In one implementation, the program attributes include general parameters such as title, time, or channel as described above. The system can temporarily record an entire program segment using the user specified parameters (step 410). The system can then identify a specific program sub-segment to store. The system can identify the beginning of the sub-segment (step 415) and the end of the sub-segment (step 420) to be stored using the same techniques disclosed above with respect to FIG. 3. For example, the system can use time offsets and/or keywords found in the audio or closed-caption streams of the program. After the beginning and ending points of the sub-segment are identified, the sub-segment can be parsed from the program segment and stored for later retrieval (step 425).

If the user retrieves the program sub-segment prior to the broadcast of an updated program sub-segment (step 430), the system can then present the program sub-segment to the user as the most recent program sub-segment (step 435). If, however, an updated program sub-segment is broadcast before the user retrieves the program sub-segment (step 430), the system can store the updated program sub-segment (e.g., using update engine 238). The system identifies and stores the updated program sub-segment as previously described in steps 415, 420, and 425. The updated program sub-segment can replace the previously stored version of the program sub-segment or can be stored in addition to the previous program sub-segment. The system continues to store updated versions of the program sub-segment until the user retrieves the most recent program sub-segment to view. Once the user initiates retrieval of the sub-segment, the system provides the most recent version of the program sub-segment to the user (step 435).

In an alternative implementation, the system can record updated versions of a full program segment for presentation of the most recent version to a user. For example, local news broadcasts are presented several times each evening, typically at 5, 6, and 11 o'clock. The system can record each news program as the news program is broadcast until the user retrieves the news program. For example, in one implementation the system can first record and store the 5:00 broadcast of the news program. If the user has not retrieved the 5:00 news program by 6:00, the system can then record the 6:00 news program and store the news program in place of the 5:00 broadcast. If the user retrieves the news program at 10:00, the system can provide the 6:00 news broadcast to the user as the most recent news broadcast. If the user does not retrieve the news program until 12:00, the system can instead provide the 11:00 news program to the user as the most recent news program. Thus, the stored program presented to the user can depend upon when the user retrieves the stored program. The process of storing the most recent program can be applied to both the recording of a complete program segment as well as a program sub-segment.

In one implementation, a delay can be set before storing a subsequent update. For example, the local forecast on the Weather Channel can appear six times an hour. Instead of storing the local forecast each time it is updated during that hour, the system can skip some of the updated sub-segments. For example, the system can store an updated local forecast twice per hour instead of each of the six times the local forecast is broadcast.

Figure 5:
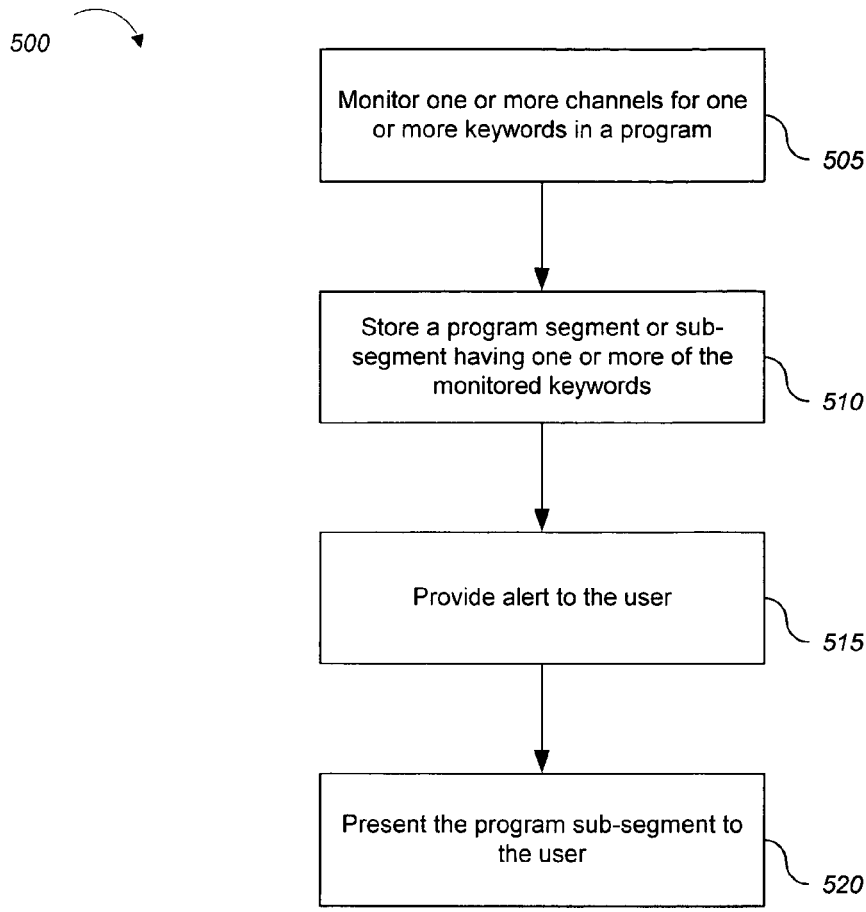
FIG. 5 shows a method for monitoring broadcasts for programs to record.

In another implementation, the system can monitor a broadcast stream for particular triggers that can indicate a program segment or sub-segment of interest to the user (e.g., using monitor trigger engine 240). A method 500 for monitoring broadcasts for programs of interest is shown in FIG. 5. The system can receive user input of preferences or interests (step 505). In one implementation, a user can input keywords relating to topics or individuals that the user is interested in viewing content about, but not from any particular broadcast program. The user can input an interest in a particular actresses, athlete, politician, or a company or business figure. For example, the user can input a company name (e.g., "Coca-Cola") such that the system will monitor the broadcast stream for content related to the company. In another example, the system can monitor local broadcast channels for news reports on local politicians. The segments about local politicians can then be stored for subsequent user viewing. Alternatively, the user can input an interest in a particular topic such as college basketball. In one implementation, the system can record within a time frame or continuously and then search the recorded content for one or more triggers. When a trigger is discovered, the system can store a segment or sub-segment with a starting point that occurs before (at or after) the occurrence of the trigger. For example, if the trigger keyword is Coca-Cola, the system can begin recording a sub-segment a predetermined amount of time (e.g., thirty seconds) before the keyword Coca-Cola occurred.

Once the user has input preferences, the system can monitor the broadcast stream for programming content matching the user preferences. The system can monitor one or more specific channels or all of the channels at one time. The user can input a time parameter indicating the period of time over which the system should monitor channels. Alternatively, preset time limits can be pre-programmed into the system. The system can monitor closed-caption streams for each channel, audio streams from each channel, or a combination of both in order to identify programming content of interest. Once content has been identified, the beginning and ending points of recording to store can be determined. When a program segment or sub-segment is identified as including the subject matter of interest to the user, the system can store the program segment or sub-segment (step 510).

In one implementation, the entire program segment that includes the keyword or keywords of interest is stored for later retrieval by the user. In another implementation, a sub-segment of a program that includes the keyword or keywords is stored. For example, a business news program can have a short segment on Coca-Cola. Instead of storing the entire program, the system can store just the relevant sub-segment of interest. In one implementation, the system uses the time offset to set a period of time defining the sub-segment to store. For example, in one implementation, the program stores a ten minute sub-segment following the occurrence of a keyword. In another implementation, the system monitors the program for indications that the particular sub-segment is at an end. For example, by monitoring the closed-caption or audio stream for keywords associated with the end of a sub-segment. Similarly, video frames can also be used to indicate the end of a sub-segment of interest as described above.

In another implementation, the system consults the program listing information to determine length of time to store. For example, if "Coca-Cola" occurs in a broadcast listed as a news program, it is likely that the relevant length of time to record is a relatively short sub-segment of the news program. In another example, however, the keyword of interest can occur in a program indicating more in-depth coverage of the topic, and thus the length of time to record can be the entire program segment.

In one implementation, a single broadcast channel is monitored for one or more keywords of interest instead of the entire broadcast stream. For example, a user can input parameters to have CNN monitored throughout a specified time frame for mentions of a particular company or topic. If found, the system can record a time frame around the keyword, for example one minute before and three minutes after the occurrence of the keyword.

In one implementation, identifying one or more keywords in the monitored broadcasts can trigger an alert to the user (step 515) (e.g., using alert engine 242). The system can alert the user to an item that can be of particular interest. For example, the system can turn on the TV or page, email, or text message the user. A message to the user can indicate the nature of the content that resulted in the alert. The program segment or sub-segment can then be presented to the user (step 520). The program segment or sub-segment can be presented immediately, for example, when the alert turns on the TV. Alternatively, the system can provide an alert message and then store the program segment or sub-segment for later retrieval by the user.

In one implementation, the preferences input by the user to the system can result in a situation where there is more than one program or program sub-segment to record at a same time. A conflict resolution system can be included in system that can select the program to record based on a priority assessment (e.g., using conflict resolution engine 244). The user can indicate priority in the input preferences. Alternatively, the system can include rules in the conflict system for assigning priority to different types of recording tasks. In an alternate implementation, the system can be operable to record more than one program or program sub-segment simultaneously.

The invention and all of the functional operations described herein can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results.

What is claimed is:

1. A method of digitally recording a sub-segment of a broadcast program segment, comprising:
   receiving a user input of one or more user specified parameters to identify a portion of said program segment to be recorded;
   monitoring at least one broadcast stream for said one or more parameters;
   recording a program segment based on the one or more user specified parameters;
   identifying a sub-segment starting point within the recorded program segment using data in a broadcast stream;
   identifying a sub-segment ending point within the recorded program segment;
   storing the program sub-segment from said starting point to said ending point;
   monitoring for an update of the stored program sub-segment;
   determining whether the stored program sub-segment has been retrieved prior to the broadcast of an updated program sub-segment;
   automatically recording the updated program sub-segment and replacing the stored program sub-segment with the recorded updated program sub-segment, in response to determining that the stored program sub-segment has not been retrieved prior to the broadcast of the updated program sub-segment; and
   providing the stored program sub-segment, if a user retrieves the stored program sub-segment prior to the broadcast of the updated program sub-segment.

2. The method of claim 1, where identifying a program sub-segment starting point further comprises searching for one or more keywords in a closed-caption stream of the program.

3. The method of claim 1, where identifying a sub-segment starting point further comprises searching for one or more keywords in an audio stream of the program.

4. The method of claim 1, where identifying a sub-segment starting point further comprises searching for a particular video frame in the program.

5. The method of claim 1, further comprising:
   determining that a user specified parameter is present in a plurality of broadcast streams broadcast at a same time; and
   recording each of the plurality of broadcast streams.

6. The method of claim 1, further comprising:
   determining that a user specified parameter is present in a plurality of broadcast streams broadcast at a same time; and selecting only one of the broadcast streams to record based on a user specified rule.

7. The method of claim 1, further comprising:
providing an alert to the user in response to identifying one or more of the user specified parameters in the broadcast program segment.

8. The method of claim 7, wherein the providing an alert comprises one of turning on a television or sending a communication to the user.

9. The method of claim 8, wherein the providing an alert further comprises:
turning on the television, and
presenting the sub-segment for viewing.

10. A computer program product, tangibly stored on a machine-readable storage device, for storing a sub-segment of a program segment, comprising instructions operable to cause a programmable processor to:
receive a user input of one or more user specified parameters to identify a portion of said program segment to be recorded;
monitor at least one broadcast stream for said one or more parameters;
record a program segment based on the one or more user specified parameters;
identify a sub-segment starting point within the recorded program segment using data in a broadcast stream;
identify a sub-segment ending point within the program segment;
store the program sub-segment from said starting point to said ending point;
monitor for an update of the stored program sub-segment;
determine whether the stored program sub-segment has been retrieved prior to the broadcast of the updated program sub-segment;
automatically record the updated program sub-segment and replace the stored program sub-segment with the recorded updated program sub-segment, in response to determining that the stored program sub-segment has not been retrieved prior to the broadcast of the updated program sub-segment; and
provide the stored program sub-segment, if a user retrieves the stored program sub-segment prior to the broadcast of the updated program sub-segment.

11. The computer program product of claim 10, further including instructions to cause the processor to:
determine that a user specified parameter is present in a plurality of broadcast streams broadcast at a same time; and
select each of the plurality of broadcast streams to record.

12. The computer program product of claim 10, further including instructions to cause the processor to:
determine that a user specified parameter is present in a plurality of broadcast streams broadcast at a same time; and
select only one of the broadcast streams to record based on a user specified rule.

13. An apparatus, comprising:
an input operable to receive a user input;
a memory operable to store one or more program segments or sub-segments;
a controller including one or more engines operable to monitor one or more broadcasts and identify particular program segments, said controller configured to:
receive a user input of one or more user specified parameters to identify a portion of said segment to be recorded;
monitor at least one broadcast stream for said one or more parameters;
record a program segment based on the one or more user specified parameters;
identify a sub-segment starting point within the recorded program segment using data in a broadcast stream;
identify a sub-segment ending point within the recorded program segment;
store the program sub-segment from said starting point to said ending point;
monitor for an update of the stored program sub-segment;
determine whether the stored program sub-segment has been retrieved prior to the broadcast of the updated program sub-segment;
automatically record the updated program sub-segment and replace the stored program sub-segment with the recorded updated program sub-segment in response to determining that the stored program segment has not been retrieved prior to the broadcast of the updated program sub-segment; and
provide the stored program sub-segment, if a user retrieves the stored program sub-segment prior to the broadcast of the updated program sub-segment.

14. The apparatus of claim 13, wherein said controller is further configured to:
determine that a user specified parameter is present stream in a plurality of broadcast streams broadcast at a same time, and
select each of the plurality of broadcast streams to record.

15. The apparatus of claim 13, wherein said controller is further configured to:
determine that a user specified parameter is present in a plurality of broadcast streams broadcast at a same time, and
select only one of said broadcast streams to record based on a user specified rule.

* * * * *